United States Patent [19]

Tuckey

[11] Patent Number: 4,820,139
[45] Date of Patent: Apr. 11, 1989

[54] SELF-CONTAINED ROTARY FUEL PUMP

[75] Inventor: Charles H. Tuckey, Cass City, Mich.

[73] Assignee: Walbro Corporation, Cass City, Mich.

[21] Appl. No.: 391,561

[22] Filed: Jun. 24, 1982

Related U.S. Application Data

[63] Continuation of Ser. No. 123,103, Feb. 19, 1980, Pat. No. 4,352,641.

[51] Int. Cl.[4] .................... F04C 15/02; F04B 35/04
[52] U.S. Cl. .................................. 418/135; 417/360; 403/282
[58] Field of Search ............... 418/135, 131, 134, 132; 417/360; 403/282

[56] References Cited

U.S. PATENT DOCUMENTS

| | | | |
|---|---|---|---|
| 1,539,728 | 5/1925 | Ensign | 418/135 X |
| 2,670,688 | 3/1954 | Graham | 418/135 |
| 2,899,941 | 8/1959 | Adams | 418/135 X |
| 2,941,479 | 6/1960 | Rosaen | 418/135 X |
| 4,199,304 | 4/1980 | Strikis et al. | 418/135 X |

Primary Examiner—Randolph A. Reese
Assistant Examiner—Peter M. Cuomo
Attorney, Agent, or Firm—Barnes, Kisselle, Raisch, Choate, Whittemore, Hulbert

[57] ABSTRACT

An electric fuel pump which is self-contained in a unitary housing with a fuel inlet at one end leading to a rotary eccentric pump, the pumped fuel passing out an outlet at the other end of the housing. A relief valve in the form of a shaped plate at the pump end bypasses fuel when there is reduced demand at the outlet. The outlet end of the pump is formed as a brush holder for the electric drive motor and a magnet retainer for the field assembly. A self-aligning composite pump assembly is utilized with a motor housing. A substantially constant pressure at the outlet with varying outlet flow is the function of the relief valve.

1 Claim, 3 Drawing Sheets

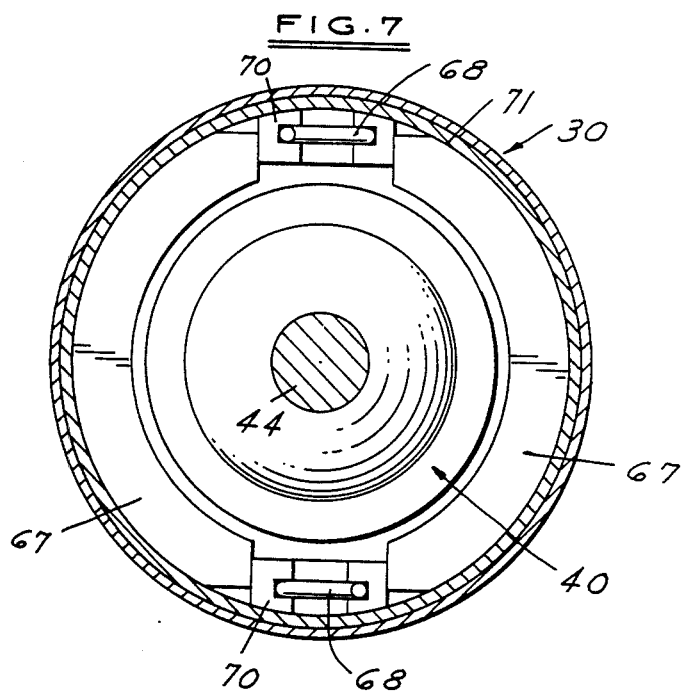
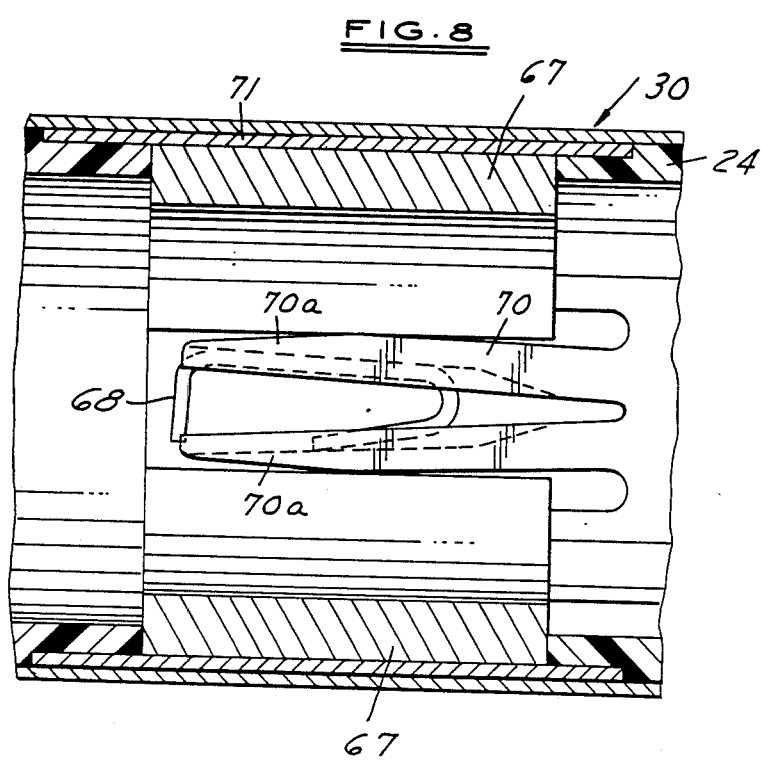

SELF-CONTAINED ROTARY FUEL PUMP

This application is a division of my copending application, Ser. No. 123,103, filed Feb. 19, 1980, now U.S. Pat. No. 4,352,641, issued Oct. 5, 1982.

FIELD OF INVENTION

The invention is directed to fuel pumps for internal combustion engines and particularly to pumps useful on automotive vehicles to furnish fuel from the gasoline tank to the engine in response to demands of the engine.

REFERENCE TO RELATED APPLICATIONS:

Reference is made to my copending application, Ser. No. 228,346, filed Jan. 26, 1981, now U.S. Pat. No. 4,401,416, issued Aug. 30, 1983, entitled "Self-Contained Rotary Fuel Pump," which is a continuation-in-part of application, Ser. No. 123,102 (now abandoned), filed Feb. 19, 1980.

BACKGROUND OF THE INVENTION

Automotive vehicles have used gravity feed for fuel in the early stages of the industry and the next phase beyond this was a diaphragm pump in which the diaphragm was mechanically pulsed by a lever actuated by a cam actuated by the engine itself. Also, electric pumps have been used with the pumping action provided by a solenoid armature reciprocating in a solenoid winding in response to electrical contacts in a circuit responsive to the motion of the armature.

In every case there is a problem of matching the fuel supply to the demand of the engine under all conditions of operation, whether it be idling, full open throttle at high speed, or open throttle under load such as climbing a hill or moving through sand or snow where the load causes a reduced speed even with open throttle.

It is also important to have a fuel pump which will have a reliable output under all conditions of ambient temperature in winter and summer.

It is an object of the present invention to provide a constant speed rotary electric pump which can yet respond to fuel demand by the operation of a unique relief or by-pass valve at the rotary pump inlet. A further object is a rotary pump design which has a steady, even output flow with minimal surging in the output so the engine fuel mixing device can perform its function unaffected by a surging fuel supply.

Another object is a pump design which is compact and of a size to be easily mounted in a safe area in an automotive vehicle. It can be mounted in or out of the fuel tank.

Another object is to provide a unit wherein the pump assembly automatically aligns itself to the motor shaft, thus preventing friction or binding due to misalignment.

Other objects include providing a pump relief system which can provide a substantially constant pmp outlet pressure even though the outlet flow may vary from the maximum desired flow to a minimum flow.

The pump incorporates a simple pressure regulator valve in conjunction with pulse adsorption devices to provide a smooth flow of fuel. The pressure relief valve is designed for an initial lift-off in response to pump pressure and automatically expose additional area to the pressure to steady the by-pass and avoid an erratic or jerky "hunting" for the desired pressure. Attention is directed to U.S. Pat. Nos. to Catterson, 3,415,195, dated Dec. 10, 1968, and O'Connor, 3,470,824, dated Oct. 10, 1969, where a magnetic relief valve plate is utilized in connection with a rotary fuel pump.

A further object is the provision of a retainer shell which holds the respective parts together under resilient compression in a sealed relationship.

A further object of the invention is the provision of a pump shaft bearing at the outlet end of the pump assembly and a pump housing retainer shoulder at the pump end cooperating with a spherical annular surface to permit pump shaft alignment without binding forces on the shaft.

A further object is the provision of a rotary pump housing with an outlet end plate and bearing pressfitted therein to a proper relationship with the pump rotor, thus avoiding expensive machining operation to obtain a proper fit. A resiliently biased relief plate with annular pockets for exposure to pump outlet pressure is provided at the inlet end of the pump in the form of a thin metal disc with annular pressure ridges disposed in a common plane.

Other objects and features of the invention will be found in the following description and claims in which the principles of the invention are set forth, together with a detailed description and parts which make up the operating assembly, all in connection with the best modes presently contemplated for the practice of the invention.

BRIEF DESCRIPTION OF THE DRAWINGS:

DRAWINGS accompany the disclosure, and the various views thereof may be briefly described as:

FIG. 7, a sectional view on line 7—7 of FIG. 1 showing the magnet assembly and retainers.

FIG. 8, a view from the top of FIG. 7 with some parts deleted for clarity.

DESCRIPTION OF THE INVENTION AND THE MANNER AND PROCESS OF MAKING AND USING THE INVENTION

Figure 1:
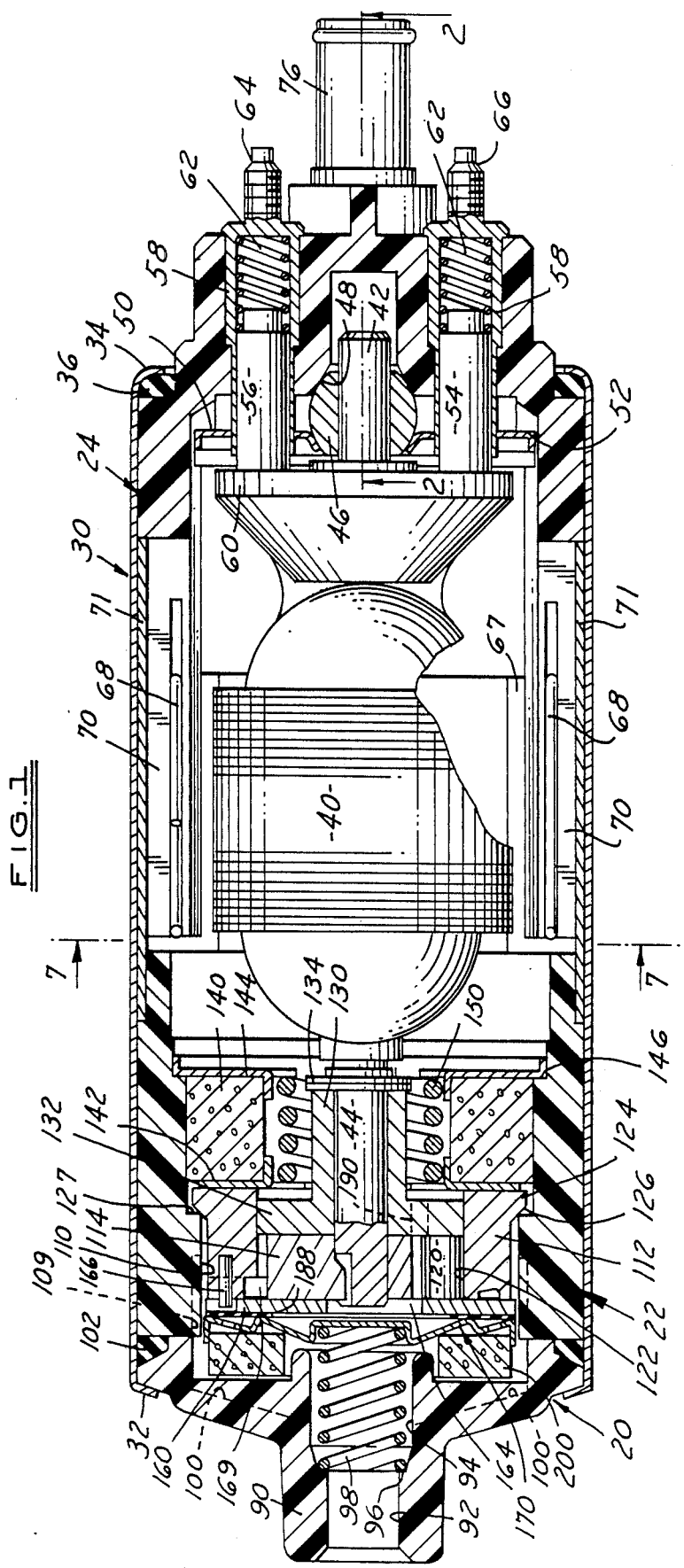
FIG. 1, a longitudinal sectional view of an assembled pump constructed in accordance with the invention.

WITH REFERENCE TO THE DRAWINGS, FIG. 1 illustrates the assembled parts which, from left to right, include an inlet cap 20, a cylindrical pump housing 22 with a stepped bore, and an outlet end housing 24 which houses an armature assembly, brushes and the like to be described. These parts are housed in a metallic shell 30 flanged at 32 to retain the inlet end 20 and flanged at 34 at the other end around a compressible O-ring 36 which bears against a shoulder on outlet end housing 24.

The outlet end 24 of the assembly carries an armature 40 and brush plate assembly mounted at one end on the motor shaft 42 which has a left-hand end 44 for driving a pump rotor. A spherical bearing element 46 around shaft 42 seats in a conical recess 48 and is retained by a resilient metallic retainer plate 50 pressed into a recess in housing 24 against a shoulder 52. Brushes 54 and 56 are slidable in retainer sleeves 58 and urged against a commutator plate 60 by coil springs 62. The brush retainers are conductors which have extending terminals 64 and 66. An appropriate pair of arcuate magnetic flux elements 67 (FIG. 7) are retained by spring clips 68 and are disposed around the armature 40 retained between axial arms 70 of end housing 24 and within a flux ring 71 inside the shell 30. The axial arms 70, shown in plan, in FIG. 8 are split into flexible fingers 70a and the J shaped spring members 68 tend to spread these fingers apart and cause them to bear on the ends of the arcuate flux members to hold them out against the flux ring 71.

Figure 2:
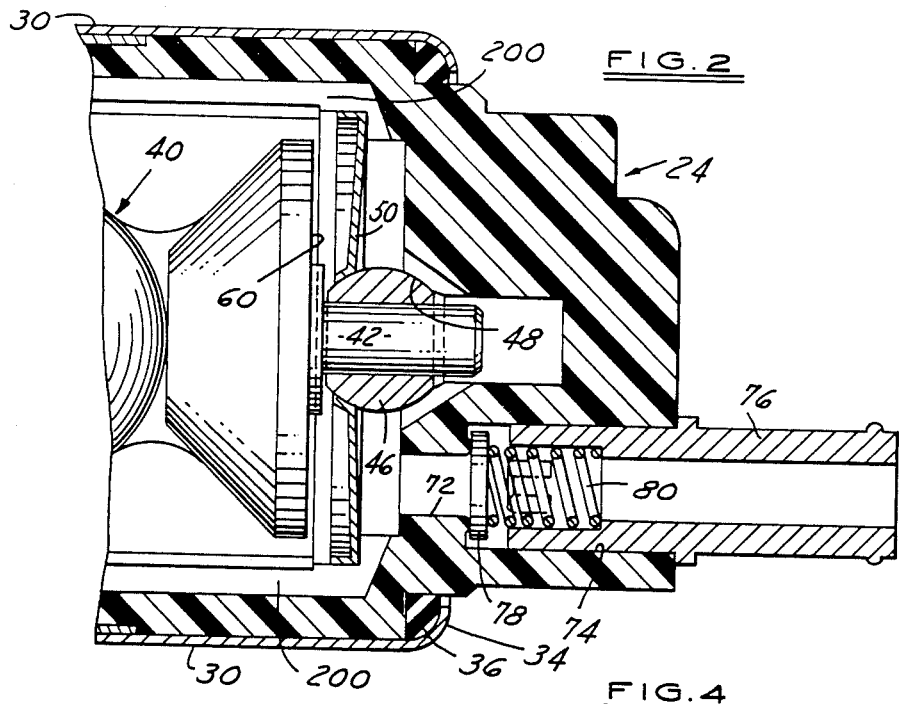
FIG. 2, a partial section of the outlet end of the pump at 90° to the showing in FIG. 1.

With reference to FIG. 2, which is a section at 90° to that of FIG. 1, a pump outlet port 72 opens to a bore 74 which supports an outlet nipple tube 76. A valve seat at the juncture of port 72 and bore 74 cooperates with a valve member 78 urged against the seat by a spring 80. The outlet pressure of the pump must unseat this valve which closes to contain fuel in the pump in the event of a power loss or engine shut-off if used in an automotive vehicle. This valve also retains fuel in the event of an accident which results in overturn of a vehicle.

The spherical bearing 46 around the shaft 42 has a function in the armature shaft alignment as will be described below.

Turning now to the pumping structure, shown in FIGS. 1 and 3 to 6, the inlet end cap 20 has a connector nipple 90 surrounding an inlet port 92. The inner surface of end cap 20 has a bore 94 enlarged from port 92 to form a shoulder 96 which serves as a seat for one end of a coil spring 98. Radial slots 100 provide fuel passages for incoming fuel and the intervening ribs strengthen the end cap. An O-ring or other suitable packing ring 102 is interposed between end cap 20 and housing member 22 and retained under resilient compression by flange 32 of shell 30.

Figure 3:
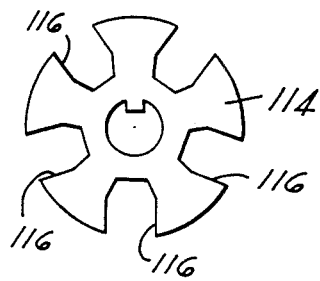
FIG. 3, an elevational view of a pump rotor.
Figure 4:
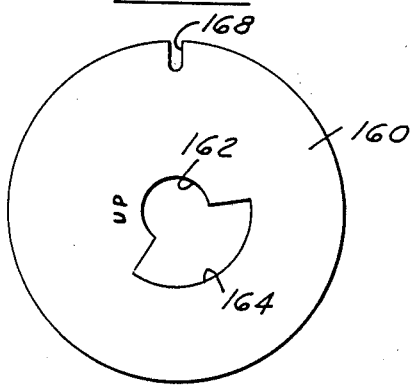
FIG. 4, an elevation view of an end plate for a pump.
Figure 5:
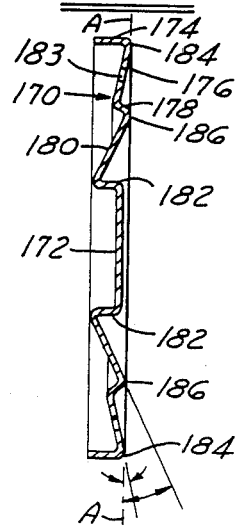
FIG. 5, a sectional view of a relief valve plate.
Figure 6:
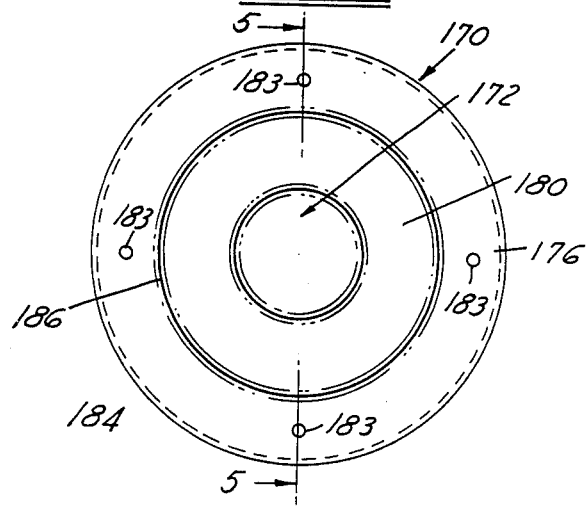
FIG. 6, an elevation of the relief valve plate shown in FIG. 5.

Cylindrical housing 22 has a first bore 110 which carries an outer circumferential pump housing or cam ring 112 in which rotates pump rotor 114 driven by a key-slot engagement on end 44 of motor shaft 42. The elevation profile of rotor 114 is shown in FIG. 3, there being circumferentially spaced radial slots 116 opening to the periphery to carry rollers 120 which serve as pump vanes, these being held out against the outer periphery of the eccentric recess 122 in cam ring 112 by centrifugal force.

The right-hand end of the cam ring 112 has an annular enlargement 124 with a surface 126 which is preferably spherical. This surface bears against a corner of a shoulder 127. There is sufficient clearance between cam ring 112 and the bore 110 to permit the ring to rock around the shoulder 127. Thus, with the spherical bearing 46 as a support for the right end of shaft 42, the entire assembly including the cam ring 112 can adjust to an alignment condition during assembly so there is no binding or bending of the shaft 42 by misalignment.

The end 44 of shaft 42 operates in a bearing collar or bushing 130 which has a flange 132 in recess 122 to close one end of the circumferential housing 112 and to serve as the back-up cover plate for the pump rotor. A thrust washer 134 is provided for the armature shaft.

In assembly, this bearing collar 130 is pressed into the cam ring recess 122 so that the flange 132 is moved to a gauged position where it has exactly the right axial clearance for the pump rotor 114, in other words, a "press fit". Webster's International Dictionary, Second Edition, 1950, defines a "press fit" as a force fit. The Metals Handbook, 8th Ed. of American Society for Metals, 1961, defines "press fit" as "an interference or force fit through the use of a press." The fit between the collar and the cam ring is such that this position will be stable in operation. Thus, expensive machining is avoided by this construction and assembly.

To the right of the cam ring is a pulse dampener ring in the form of a ring 140 of closed cellular material resistant to hydrocarbons supported between retainers 142 and 144, the latter shell being pressed in against shoulder 146. A relatively heavy coil spring 150 presses against the shell 142 to urge the pump assembly to the left against the shoulder 127.

The end of the pump opposed to flange 132 is composed of a closure assembly which also serves as a relief valve to by-pass fluid under certain conditions of operation. An aluminum disc 160 with an open center hole 162 (FIG. 4) enlarged to a segmental slot 164 bears against the inlet end of cam ring 112 and the rotor 114. A pin 166 anchored in ring 112 passes through a notch 168 in disc 160 to provide circumferential orientation. To the left of this disc 160 is a pressure regulating valve plate 170, shown in FIGS. 5 and 6, which has as shallow central cup 172 serving as a retainer for coil spring 98 which urges the plate 170 toward the disc 160. The plate 170 is formed of stainless steel approximately 0.010 to 0.030" thick, and has an outer flange 174 with a 15° inwardly tapering annular portion 176 from face plane A—A, a return portion 178 to the face plane A—A, a second annular tapered portion 180 disposed at about 25° to the face plane A—A with a return 182 which forms the wall of cup 172. The base of the cup is spaced from the face plane A—A. Four small holes 183 (0.052–0.055" diameter) are located on diameters normal to each other. The diameter of the plate in this particular example is 2.455" but the invention is not limited to a particular dimension.

It will be seen that the above-described relief plate has two radiused annular surfaces 184 and 186 (FIG. 5) which touch the face plane A—A.

Interposed between plate 170 and disc 160 is a pressure regulating seal 188 in the form of a flat ring of thin resilient material, buna N, or other hydrocarbon resistant resilient material which is open at the center and has a radial span to overlie the annular surfaces 184 and 186.

It will be noted that there are axial passages 109 in the periphery of bore 110 in housing 22, shown in dotted lines, which align with the wall of the end cap 20 to carry inlet fluid through radial passages 169 to the periphery of the pump rotor 114. Also passages 190 in flange 132 (dotted lines) in FIG. 1 provide outlet for the pump rotor. The segmental opening 164 in disc 160 (FIG. 4) is aligned with the outlet port 190. A pulse dampener ring 200 is also positioned behind plate 170 formed of a cellular material, closed-cell type.

IN THE OPERATION

A fuel supply connected to nipple 90 furnishes fuel to port 92 where the fuel passes through radial slots 100 to the passages 109 and through passages 169 which serve as the pump inlet. Fuel flows out of the rotor through passages 190 where it flows through the armature assembly to the outlet end of end housing 24, through axial passages 200 (FIG. 2), around retainer plate 50 to the outlet passage 72, safety check valve 78, and outlet 76. The vane pump rotor and vanes operate in a manner well known in the vane pump art.

Should the pressure build up to a predetermined point in the pump outlet as established by the user, it will be reflected through segmental opening 164 in disc 160 to the relief plate 170 backed by spring 98. The resilient ring 188 serves to seal the annular surfaces 184 and 186 against disc 160. Upon the build up of a certain pump outlet pressure, the fluid will pass annular surface 186 into the annular space inside the annular surface 184 at the outer rim. Holes 183 will admit this by-passed fluid to the inlet side of the pump, and it will continue to bypass until the outlet pressure drops to the desired setting. Spring 98 will control this by-pass pressure. Holes 183 are calibrated to relieve a predetermined pressure but pressure can also by pass under annular rim 184 and the combination of these holes plus the spring pressure enables reasonably accurate control of pump outlet pressure regardless of outlet flow demand.

With respect to the overall pump assembly, it will be noted that the inlet and outlet caps 20 and 24 together with the pump surround 22 and the motor flux ring 71 are held in axial assembly by the shell 30, the flanged ends 32, 34 of which lock the parts under resilient bias of sealing rings 36 and 102.

I claim:

1. A pump body for a rotary fuel pump having an inlet end and an outlet end in which said inlet end comprises a first end plate on the inlet end of the pump, a circumferential housing having a pumping chamber closed at the inlet end by said first end plate, an outlet plate pressed into said chamber of said circumferential housing having a face to lie perpendicular to the axis of said housing, said outlet plate being positioned axially by way of a press fit into said pumping chamber of said circumferential housing to a position fixed in the housing to provide a pumping chamber with a fixed predetermined axial dimension, and a rotor in said pumping chamber between said first end plate and said face of said outlet plate with predetermined axial clearance for rotation in the pumping chamber thus formed within said circumferential housing.

* * * * *